(12) United States Patent
Southall

(10) Patent No.: US 12,043,341 B2
(45) Date of Patent: Jul. 23, 2024

(54) DISC BRAKE CALIPER LOCATION ON A TRAILING-LINK SUSPENSION FORK

(71) Applicant: Timothy Southall, Clarence Park (AU)

(72) Inventor: Timothy Southall, Clarence Park (AU)

(*) Notice: Subject to any disclaimer, the term of this patent is extended or adjusted under 35 U.S.C. 154(b) by 349 days.

(21) Appl. No.: 17/439,740

(22) PCT Filed: Mar. 13, 2020

(86) PCT No.: PCT/AU2020/050233
§ 371 (c)(1),
(2) Date: Sep. 15, 2021

(87) PCT Pub. No.: WO2020/186290
PCT Pub. Date: Sep. 24, 2020

(65) Prior Publication Data
US 2022/0169332 A1 Jun. 2, 2022

(30) Foreign Application Priority Data
Mar. 15, 2019 (AU) .............................. 2019900870

(51) Int. Cl.
*B62K 25/24* (2006.01)
*B62L 1/00* (2006.01)
*F16D 65/00* (2006.01)
*F16D 55/00* (2006.01)

(52) U.S. Cl.
CPC .......... *B62L 1/005* (2013.01); *F16D 65/0087* (2013.01); *F16D 2055/0016* (2013.01)

(58) Field of Classification Search
CPC ........ B62L 1/005; B62L 1/02; F16D 65/0062; F16D 65/0087; F16D 65/847

USPC ............ 188/24.11–24.12; 280/275, 276, 279
See application file for complete search history.

(56) References Cited

U.S. PATENT DOCUMENTS

| 4,180,280 | A | * | 12/1979 | Doveri | B62K 25/005 188/26 |
| 4,878,558 | A | * | 11/1989 | Asakura | B62K 25/005 188/344 |
| 5,259,483 | A | * | 11/1993 | Pelfrey | F16D 65/18 188/73.46 |
| 5,299,820 | A | * | 4/1994 | Lawwill | B62K 25/24 280/277 |
| 5,522,610 | A | * | 6/1996 | Teel, Sr. | B62K 13/025 280/239 |
| 11,084,552 | B2 | * | 8/2021 | Weagle | B62K 25/24 |
| 2002/0079670 | A1 | | 6/2002 | Yih | |

(Continued)

FOREIGN PATENT DOCUMENTS

| EP | 2960145 | A2 * | 12/2015 | ............. B62K 25/16 |
| GB | 1274412 | A | 5/1972 | |

OTHER PUBLICATIONS

PCT/AU2020/050233. International Search Report & Written Opinion (Jun. 4, 2020).

*Primary Examiner* — Christopher P Schwartz
(74) *Attorney, Agent, or Firm* — LOZA & LOZA, LLP; Heidi Eisenhut

(57) ABSTRACT

The present disclosure relates to the location of a disc brake caliper mounted to a trailing-link suspension fork. In one aspect, the disc brake caliper is attached to a sprung portion of the fork, hence adding zero mass and corresponding inertia to the un-sprung portion of the suspension system. Further, the disc brake caliper is positioned forward of the wheel axle and linkage member.

13 Claims, 5 Drawing Sheets

(56) References Cited

U.S. PATENT DOCUMENTS

| | | |
|---|---|---|
| 2007/0222174 A1 | 9/2007 | Pokrywka |
| 2014/0265225 A1* | 9/2014 | D'Aluisio ............... B62K 21/02 280/276 |
| 2019/0061868 A1* | 2/2019 | Weagle .................. B62K 25/24 |
| 2022/0153382 A1* | 5/2022 | Southall .............. F16D 65/0062 |

* cited by examiner

DISC BRAKE CALIPER LOCATION ON A TRAILING-LINK SUSPENSION FORK

PRIORITY DOCUMENTS

The present application claim priority from:
Australian Provisional Patent Application No. 2019900870 titles "DISC BRAKE CALIPER LOCATION ON A TRAILING LINK SUSPENSION FORK" and filed on 15 Mar. 2019

TECHNICAL FIELD

The present disclosure relates to the location of a disc brake caliper fixedly connected to a trailing-link suspension fork, and the relationship of the disc brake caliper location to the performance of the trailing-link suspension fork. In a particular form the present disclosure relates to a disc brake caliper fixedly mounted to a portion of the suspension fork that constitutes sprung mass. The disc brake caliper is located forward of the trailing-link linkage member, and wheel axle. The present invention is applicable to a front suspension system such as a suspension fork for a bicycle, motorcycle, scooter, or other wheeled vehicle.

BACKGROUND

Suspension exists to enhance the comfort, control, speed and efficiency of a bicycle or other vehicle as it traverses uneven terrain. The effectiveness of the suspension for absorbing bumps is determined by such things as the unsprung mass lighter being better, the sprung mass/unsprung mass ratio, and the axle travel path of the wheel. Other important aspects of a suspension design include its response to braking and acceleration forces, its stiffness in resisting lateral forces, and in certain cases its effect on the bike's aerodynamics. Common front suspension types include telescoping, leading link, and trailing link designs.

Disc brakes are largely favoured to provide braking duties on high performance vehicles including bicycles due to their consistent performance in diverse environmental conditions, their power and modulation, and ability to disperse unwanted heat. On the front suspension of a bicycle, the disc brake caliper/s are typically attached to a portion of the bicycle that constitutes unsprung mass. This has an adverse effect on the suspension performance. Furthermore, the location of the disc brake caliper typically adds unwanted aerodynamic drag to the bicycle, and the disc brake caliper is located where it is not exposed to the maximum cooling potential of the passing airflow.

"Reducing unsprung weight is the key to improving handling. The lower the unsprung weight, the less work the shocks and springs have to do to keep the tires in contact with the road over bumpy surfaces. Lot of problems, if not all of them is caused by inertia. Bigger weight means higher inertia. Higher inertia means more workload for shocks and springs to keep tiers on the ground. If unsprung components have a high mass they are harder to accelerate/decelerate and thus it is more difficult for the suspension to maintain a consistent tire load". http://www.formula1-dictionary.net/unsprung_weight.html Since the introduction of disc brakes to bicycle suspension forks, the disc brake calipers have always been mounted rearward of the bicycle fork. The disadvantages of this arrangement are well known and various solutions have been tried to improve the system. For example, special fenders or fins have been developed to direct more air onto the disc brake caliper to enhance the cooling of the caliper. This is a response to the caliper not being optimally located to receive the full cooling effect of the passing airflow. The downsides to this solution are increased aerodynamic drag, and increased complexity. For optimum braking performance it is advantageous to have the brake caliper mounted in such a position as to receive unobstructed airflow. This enhances the dispersion of unwanted heat. Overheating of brake components can lead to a dangerous reduction in braking performance.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect of the present invention, there is provided a disc brake equipped trailing-link suspension fork. Comprising a sprung fork and a disc brake caliper fixedly connected to a portion of the sprung fork. The system further comprising a first linkage member connected with respect to the sprung fork, the first linkage member extending rearwardly to bridge the sprung fork and the wheel axle.

In one form, the disc brake caliper is located forward of the sprung fork, first linkage member, and wheel axle.

In one form, the first linkage member is pivotally connected with respect to the sprung fork at a first main pivot point, the first linkage member extending rearwardly to bridge the main pivot point and the axle.

In one form, the first linkage member is rigid.

In one form the spring mechanism for the suspension fork is a leaf spring

In one form the spring mechanism for the suspension fork is a torsion spring

In one form the spring mechanism and for the suspension fork is telescopic

In one form, the first linkage member is Flexible, eliminating the need for a pivot point.

In one form, the flex of the first linkage member provides the spring force for the suspension system.

In one form, two linkage members are Dual link

In one form the disc brake caliper is attached to the sprung fork at a location essentially vertically horizontally inline with the wheel axle For ease of description, disc brake equipped trailing-link front suspension systems embodying the various aspects of the present invention are described below in their usual assembled position as shown in the accompanying drawings and terms such as front, rear, upper, lower, horizontal, longitudinal etc., may be used with reference to this usual position. However, the disc brake equipped trailing link front suspension systems may be manufactured, transported, sold, or used in orientations other than that described and shown here.

A detailed description of one or more embodiments of the invention is provided below along with accompanying Figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the Figures.

DESCRIPTION OF EMBODIMENTS

A conventional disc brake equipped trailing-link suspension fork for a bicycle or other wheeled vehicle typically has the disc brake caliper located in such a position that it is un-sprung mass. That is to say that when the wheel encounters a bump and accelerates vertically up and over the bump, the disc brake caliper also moves vertically. Thus, the mass of the disc brake caliper negatively effects the performance of the front suspension system by adding un-sprung mass.

For the purpose of this specification, the term "disc brake caliper" should be construed as being inclusive of any member whose primary function is to provide braking forces by squeezing brake pads on the disc brake rotor, causing friction that converts the kinetic forward momentum into heat, thus slowing the vehicle.

For the purpose of this specification, the term "disc brake rotor" should be construed as being inclusive of any member whose axis of rotation is fixedly connected to the wheel, and whose primary function is to provide a surface unto which the disc brake caliper and brake pads can squeeze onto, the generated friction converting the forward momentum of the vehicle into heat, thus slowing the vehicle.

For the purpose of this specification, the term "trailing-link" suspension fork should be construed as being inclusive of any linkage type front suspension system wherein the main pivot point for the suspension is located forward of the front wheel axle.

For the purpose of this specification, the term "suspension fork" should be construed as being inclusive of any member whose primary function is to hold and provide a rotable connection to the front wheel, and a pivotal connection to the bicycle frame enabling steering of the bicycle and rotation of the front wheel. While also providing a bump absorbing mechanism to help isolate the rider from impacts due to encountering uneven surfaces.

For the purpose of this specification, the term "un-sprung mass" should be construed as being inclusive of any member whose mass and corresponding inertia is not insulated from vertical accelerations of the wheel as it responds to bumps encountered.

For the purpose of this specification, the term "sprung mass" should be construed as being inclusive of any member whose mass and corresponding inertia is insulated via a suspension system, from the vertical accelerations of the wheel at it responds to bumps encountered.

For the purpose of this specification, the term "front wheel axle" and "wheel axle" should be construed as being inclusive of the axle of the front wheel only. The centre-point of the front wheel, about which the wheel rotates.

Figure 1:
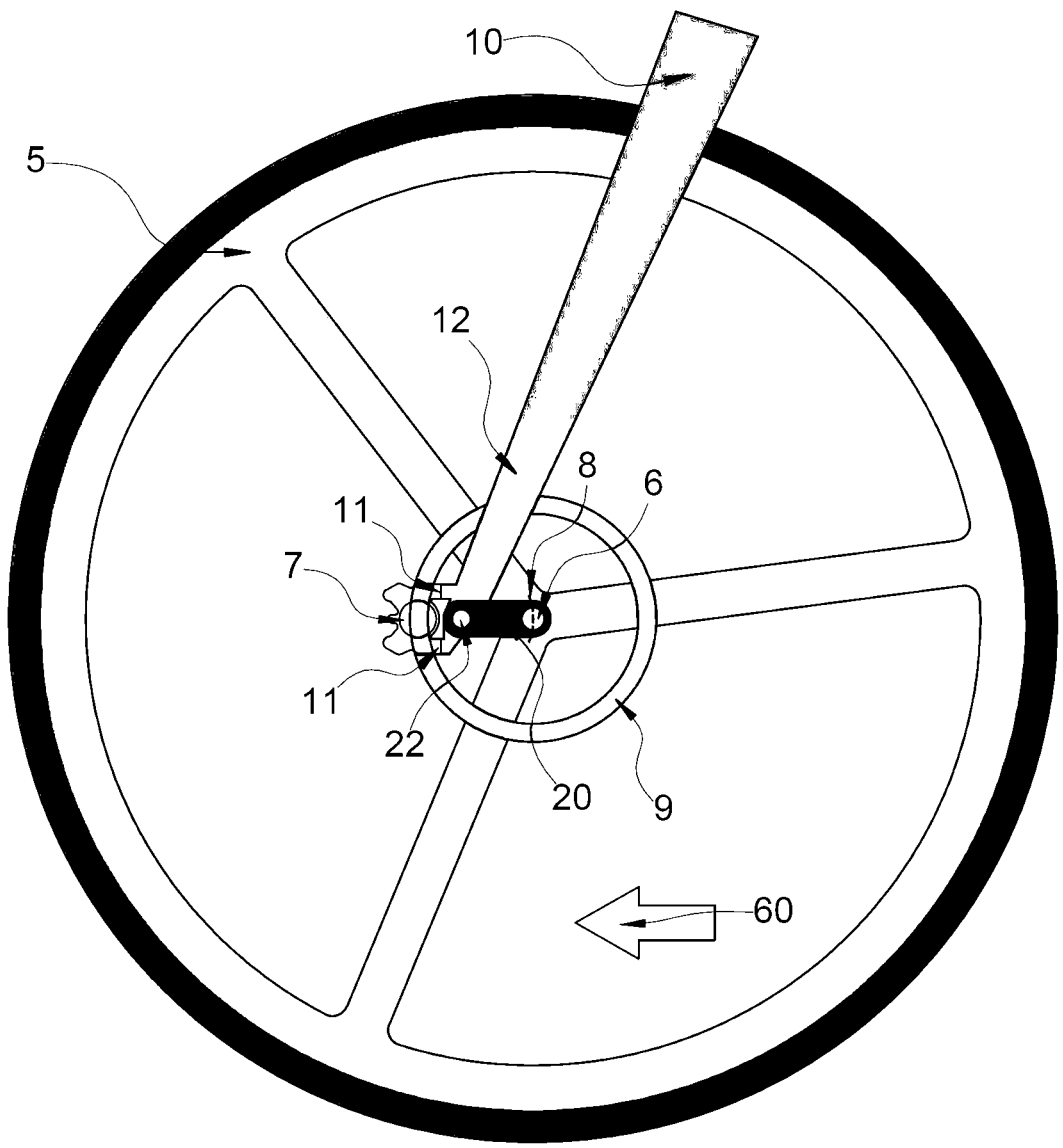
FIG. 1 is a schematic representation of a disc brake equipped trailing-link suspension fork wherein the brake caliper is mounted to a sprung portion of the suspension fork. Front wheel is illustrated; suspension is at 50% travel.

Referring now to FIG. 1, there is shown a schematic representation of a trailing-link suspension fork 10 with a disc brake caliper 7 fixedly attached to the sprung fork 12 of trailing-link suspension fork 10 at location 11 according to an embodiment of the present invention. Wherein the mass and corresponding inertia of the caliper 7 does not affect the performance of the suspension fork 10 by adding un-sprung mass. This minimisation of un-sprung mass results in optimum suspension performance. The wheel 5 rotates about its axle 6 as the bicycle travels in the forward direction 60. The axle travel path 8 is controlled by the linkage member 20 that is fixedly connected to the wheel axle 6 and pivotally connected to the sprung portion 12 of the suspension fork 10 at the main pivot point 22. The spring force of the suspension fork 10 can be provided by any form of spring mechanism including a torsion spring, leaf spring, coil spring, air spring or rubber type spring. FIG. 1 depicts the suspension system 10 at fifty percent suspension travel.

It is to be noted that for the embodiments shown in FIGS. 1-5, only the left side of the suspension fork 10 is illustrated and described. In certain embodiments the right side of the suspension fork 10 may be substantially identical to the left side, or it may be dissimilar. In certain embodiments, the suspension fork may be one sided.

Figure 2:
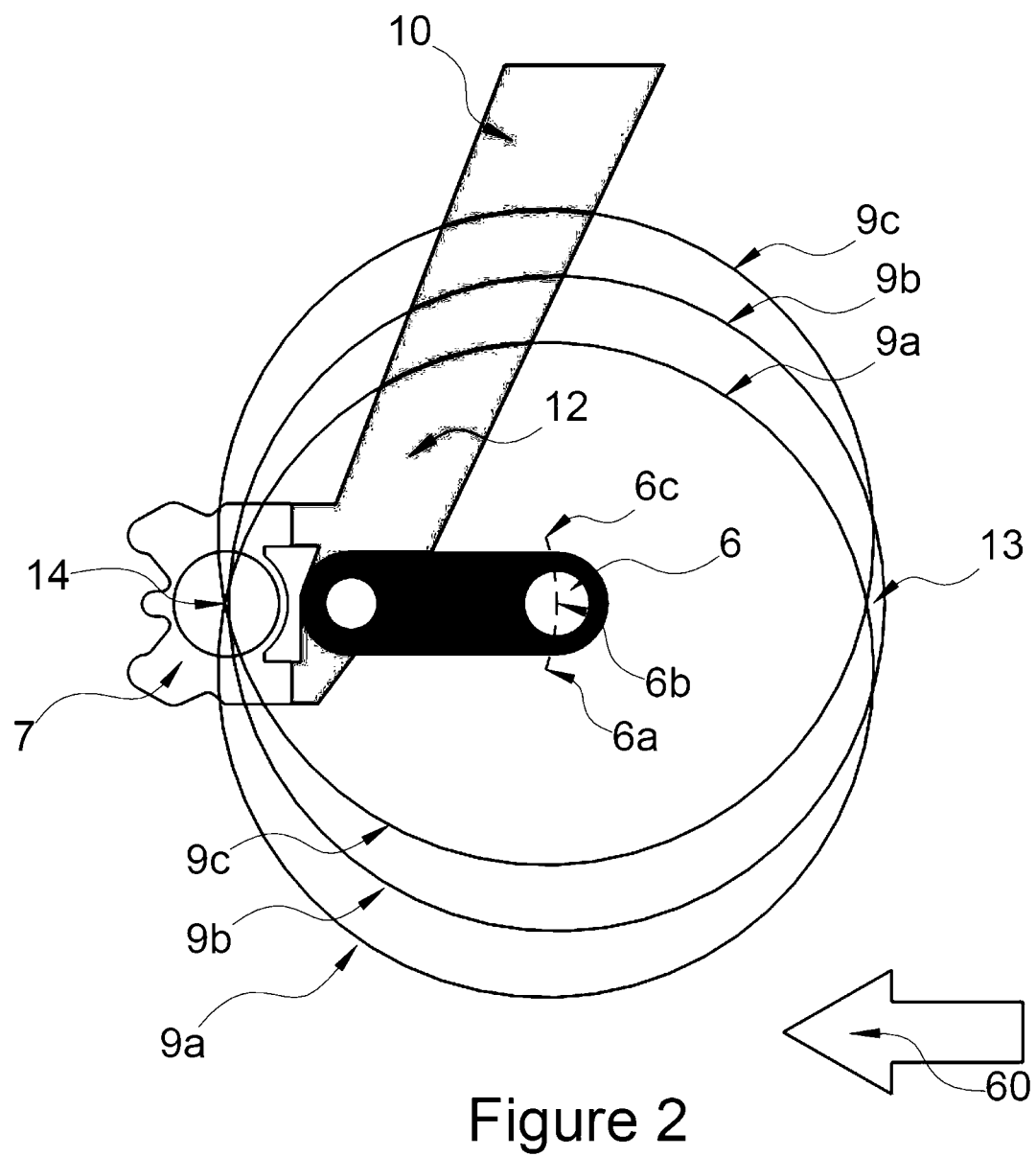
FIG. 2 is a schematic representation of a disc brake equipped trailing-link suspension fork wherein the brake caliper is mounted to a sprung portion of the suspension fork. Brake rotor centreline and front wheel axle are both illustrated at different segments of the suspension travel. Trailing link is shown at 50% suspension travel.

Referring now to FIG. 2, there is shown a schematic representation of a trailing-link suspension fork 10 with brake caliper 7 fixedly connected to a sprung portion 12 of the suspension system 10 according to an embodiment of the present invention. FIG. 2 depicts the suspension system 10 at fifty percent suspension travel. The centreline of the braking surface of the disc brake rotor 9 is here shown in three positions. Position 9a is the centreline of the rotor 9 braking surface with the suspension at zero percent travel. Position 9b is the centreline of the rotor 9 braking surface with the suspension at fifty percent travel. Position 9c is the location of the centreline of the rotor 9 braking surface with the suspension at one hundred percent travel. The positions of the centrelines of the rotor 9 braking surface corelate with the position of the wheel axle 6 at position 6a which is the suspension at zero percent travel, position 6b which is the suspension at fifty percent travel, and position 6c when the suspension is at one hundred percent travel. This is because the rotor 9 is fixedly connected to the wheel 5. The unexpected result of examining the positions of the centrelines of the rotor 9 braking surface at all points of suspension travel is that a location 14 forward of the rigid fork 12 emerges as a viable location for a caliper 7 that is fixedly connected to the sprung portion 12 of the suspension fork 10. This location is where the centrelines of the braking surface of rotor 9 are at their closest to one another throughout the suspension movement. The potential location for the caliper 7 in front of the axle 6 is herein numbered as 14. A second potential location for the caliper 7 rearward of the axle 6 is herein numbered as 13. Position 14 forward of the axle 6 is favourable for the disc brake caliper 7 compared to location 13 as it allows a simpler, lighter, and more rigid connection between the disc brake caliper 7 and the sprung fork 12. Furthermore, another result from positioning caliper 7 at location 14 is that the caliper 7 is exposed to the maximum cooling effect of the oncoming air. This improved cooling of the disc brake caliper enhances braking performance and the safety and confidence of the rider.

Figure 3:
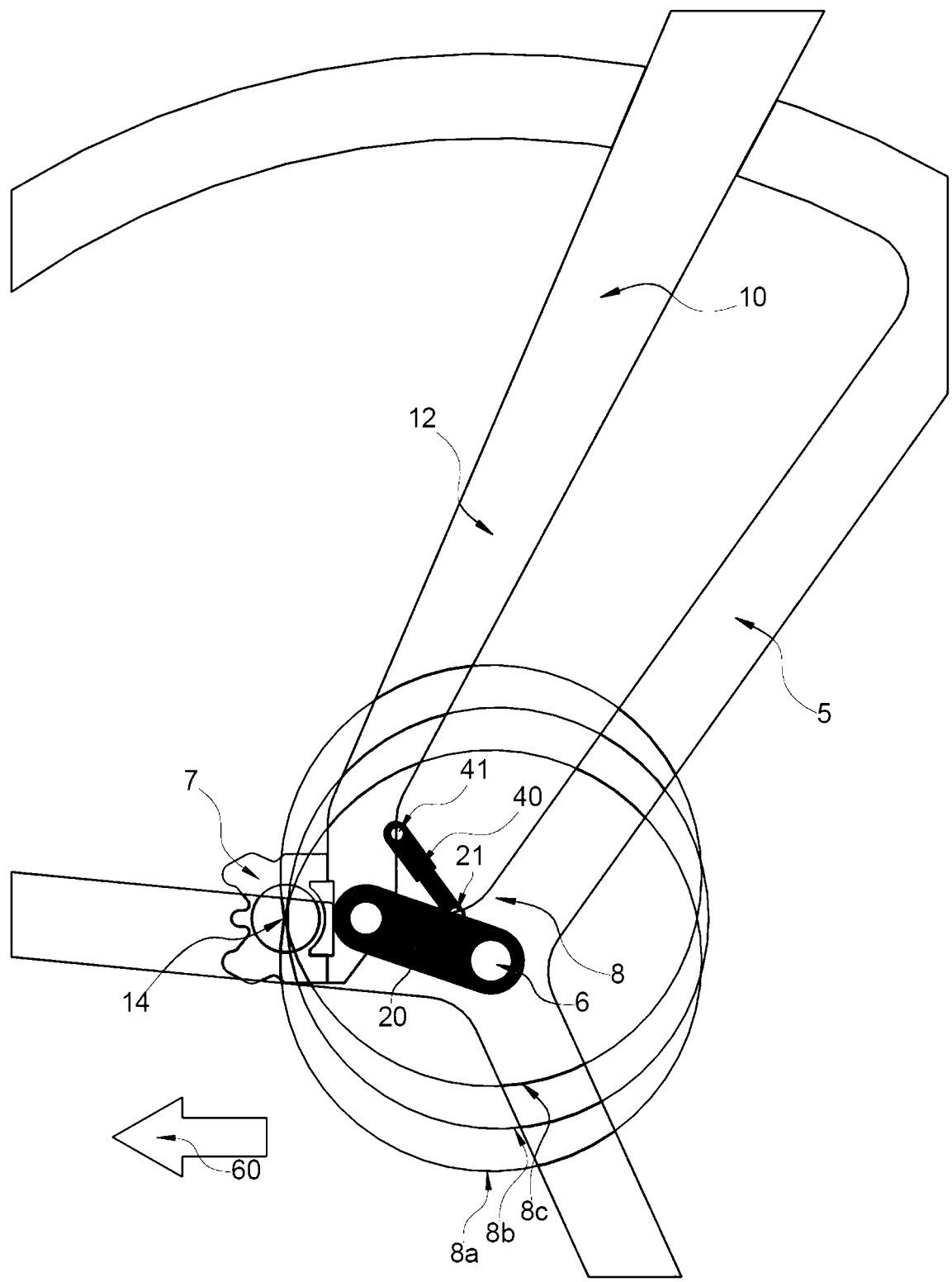
FIG. 3 is a schematic representation of a disc brake equipped trailing-link suspension fork wherein the brake caliper is mounted to a sprung portion of the suspension fork. Conventional shock is illustrated. Wheel is illustrated. Trailing-link is shown at zero percent suspension travel.

Referring now to FIG. 3, there is shown a schematic representation of a trailing-link suspension fork 10. The centre of the brake caliper 7 is positioned at location 14 according to an embodiment of the present invention. FIG. 3 depicts the suspension system 10 at zero percent suspension travel. A shock absorbing mechanism 40 is here shown pivotally connected to first linkage member 20 at shock pivot location 21, and pivotally connected to sprung fork 12 at shock pivot location 41. Aerodynamic benefits of locating the disc brake caliper 7 forward of the axle 6, first linkage member 20, and sprung fork 12, can here be observed. The axle 6 and the first linkage member 20 are positioned largely in the slipstream of the disc brake caliper 7. This reduction in aerodynamic drag due to the location of disc brake caliper 7 at location 14 is advantageous to the speed and efficiency of the bicycle. As a design feature, using a shock 40, as the spring mechanism, or to compliment the spring mechanism for the suspension may be combined with any of the other embodiments of the design previously or hereafter described.

Figure 4:
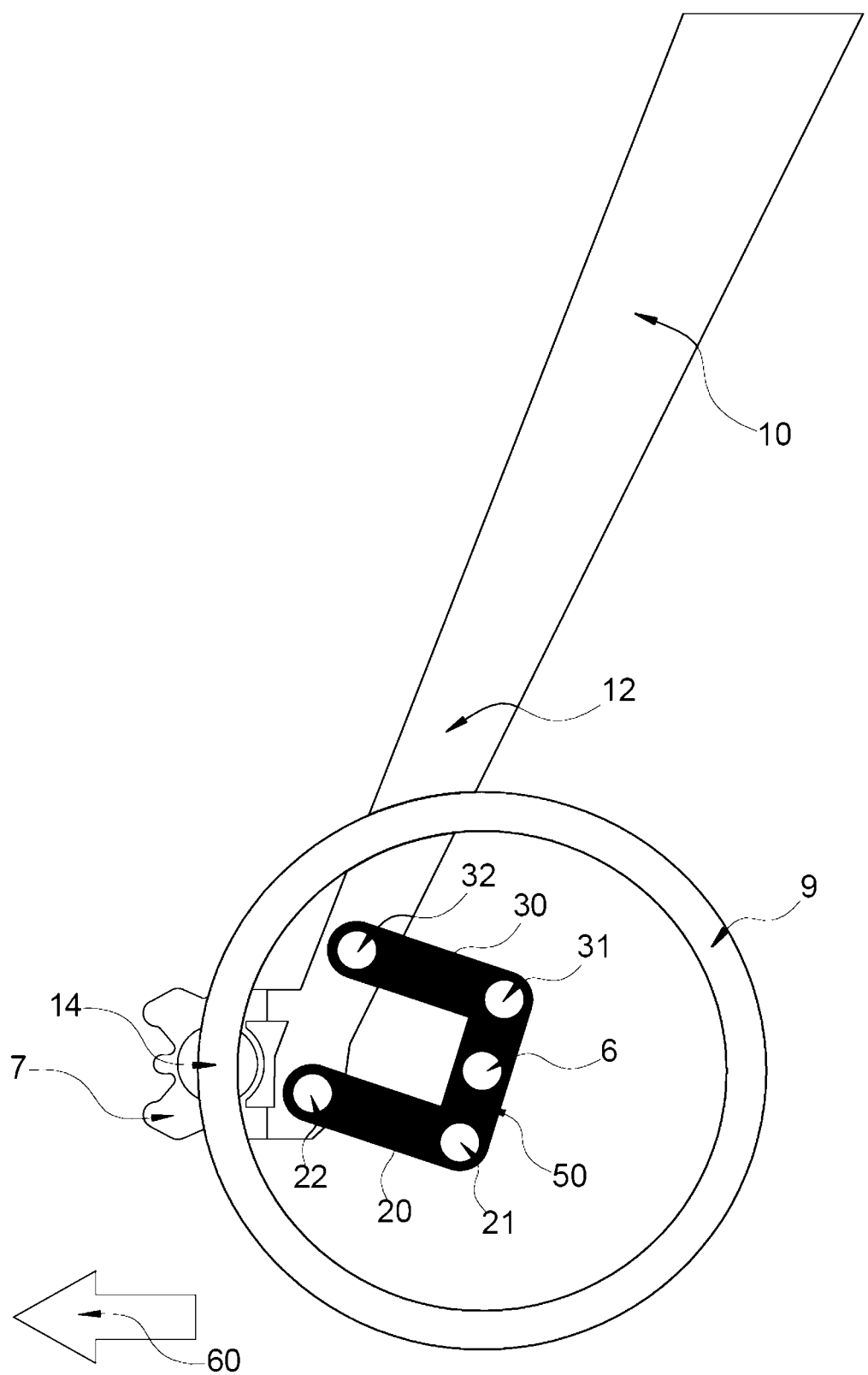
FIG. 4 is a schematic representation of a disc brake equipped trailing-link suspension fork wherein the brake caliper is mounted to a sprung portion of the suspension fork. Dual trailing links are illustrated. Suspension is at 50% travel.

Referring now to FIG. 4 there is shown a schematic representation of a trailing-link suspension fork 10. The centre of the brake caliper 7 is positioned at location 14 according to an embodiment of the present invention. A 'dual link' system is here illustrated wherein the first linkage member 20 is complimented by second linkage member 30. Second linkage member 30 is shown pivotally connected with respect to sprung fork 12 at pivot point 32 and pivotally connected to an axle support member 50 at location 31. The axle 6 can be located at any point along the axle support member 50 including above the pivot point 31, between the pivot points 31 and 21, or below the pivot point 21. In certain embodiments the second linkage member 30 can add stiffness against lateral and torsional forces. As a design feature, using second linkage member 30 may be combined with any of the other embodiments of the design previously or hereafter described.

Figure 5:
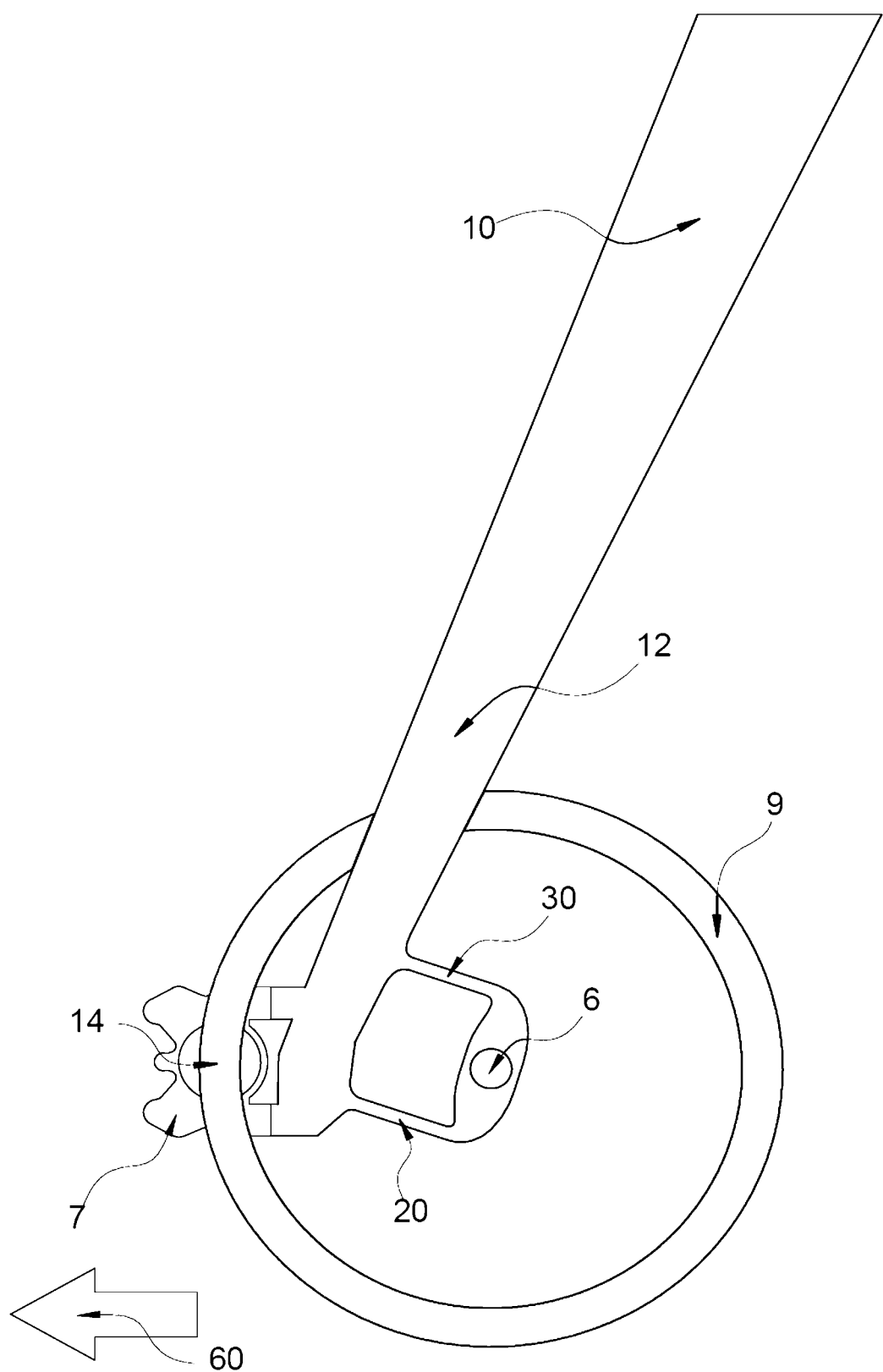
FIG. 5 is a schematic representation of a disc brake equipped trailing-link suspension fork wherein the brake caliper is mounted to a sprung portion of the suspension fork. Dual trailing links of flexible type are illustrated.

Referring now to FIG. 5 there is shown a schematic representation of a trailing-link suspension fork 10. The centre of the brake caliper 7 is positioned at location 14 according to an embodiment of the present invention. Linkage members 20 and 30 are of a flexible type designed to flex in the vertical plane. This ability to flex may in certain embodiments eliminate the need for pivot points. As a design feature, using linkage member 20, and in certain embodiments also linkage member 30 of a flexible type may be combined with any of the other embodiments of the design previously or hereafter described.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A suspension fork assembly for a bicycle, the bicycle having a frame and a front wheel rotatably connected via a front wheel axis, the trailing-link suspension fork assembly comprising:
    a front fork connected to the frame for supporting the front wheel, the front fork comprising a trailing-link suspension mechanism and a sprung fork, the sprung fork having a spring mechanism;
    a first linkage member connecting the front fork to the frame;
    a disc brake operatively connected to the front wheel for decelerating or stopping the bicycle; and
    a disc brake caliper fixedly mounted to the sprung portion of the front fork forward of the first linkage member and the wheel axle.

2. The suspension fork assembly for a bicycle of claim 1, further comprising a second linkage member pivotally connected to the sprung fork at a first end and pivotally connected to the axle support member at a second end.

3. The suspension fork assembly for a bicycle of claim 2, wherein the second linkage member is configured to add stiffness against lateral and torsional forces.

4. The suspension fork assembly for a bicycle of claim 2, wherein the first linkage member and the second linkage member are dual link.

5. The suspension fork assembly for a bicycle of claim 1, wherein the first linkage member is pivotally connected to the sprung fork at a first end and fixedly connected to the wheel axle at a second end.

6. The suspension fork assembly for a bicycle of claim 1, further comprising a shock absorbing mechanism pivotally connected to the first linkage member at a first end and pivotally connected to the sprung fork at a second end.

7. The suspension fork assembly for a bicycle of claim 1, wherein the first linkage member is rigid.

8. The suspension fork assembly for a bicycle of claim 1, wherein the spring mechanism is a leaf spring.

9. The suspension fork assembly for a bicycle of claim 1, wherein the spring mechanism is a torsion spring.

10. The suspension fork assembly for a bicycle of claim 1, wherein the spring mechanism is telescopic.

11. The suspension fork assembly for a bicycle of claim 1, wherein the first linkage member is flexible.

12. The suspension fork assembly for a bicycle of claim 1, wherein the disc brake caliper is attached to the sprung fork at a location essentially vertically in line with the wheel axle.

13. The suspension fork assembly for a bicycle of claim 1, wherein the disc brake caliper is attached to the sprung fork at a location essentially horizontally in line with the wheel axle.

\* \* \* \* \*